2,954,960

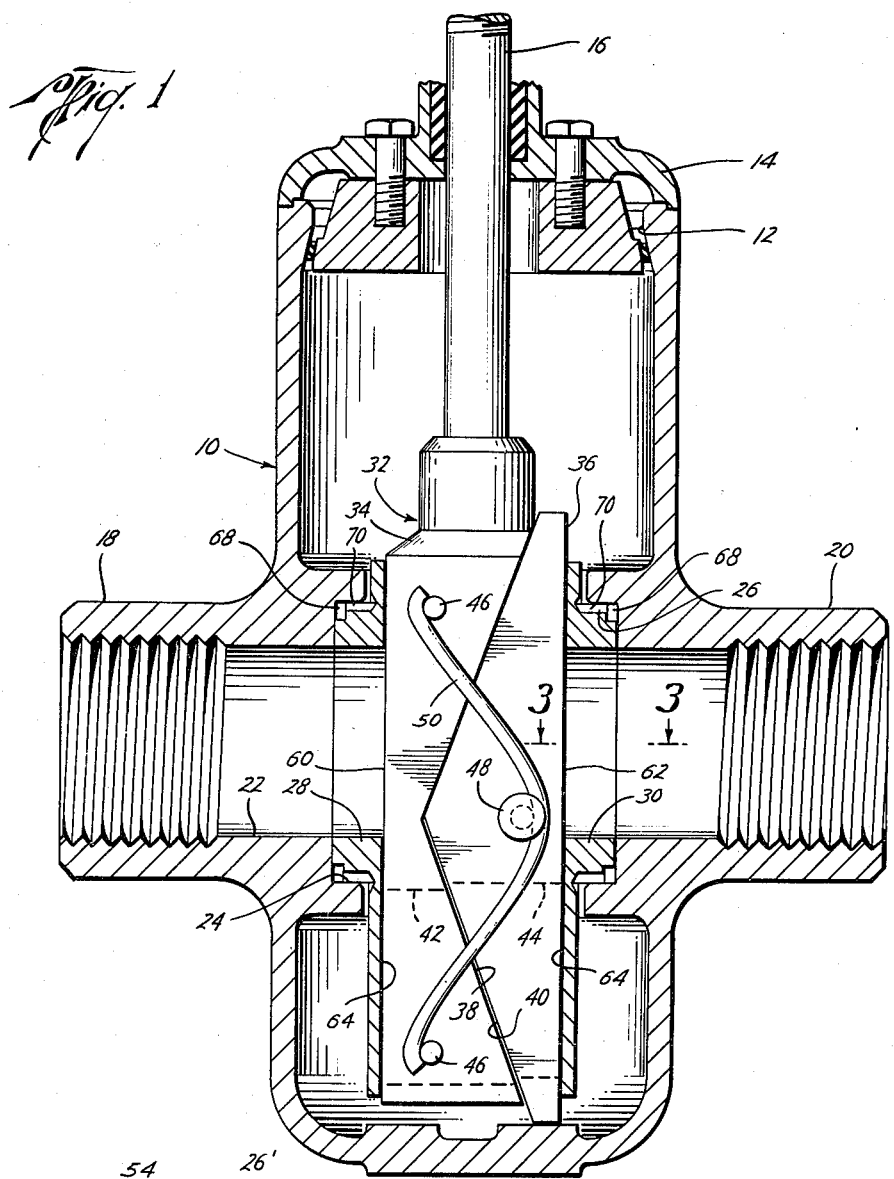

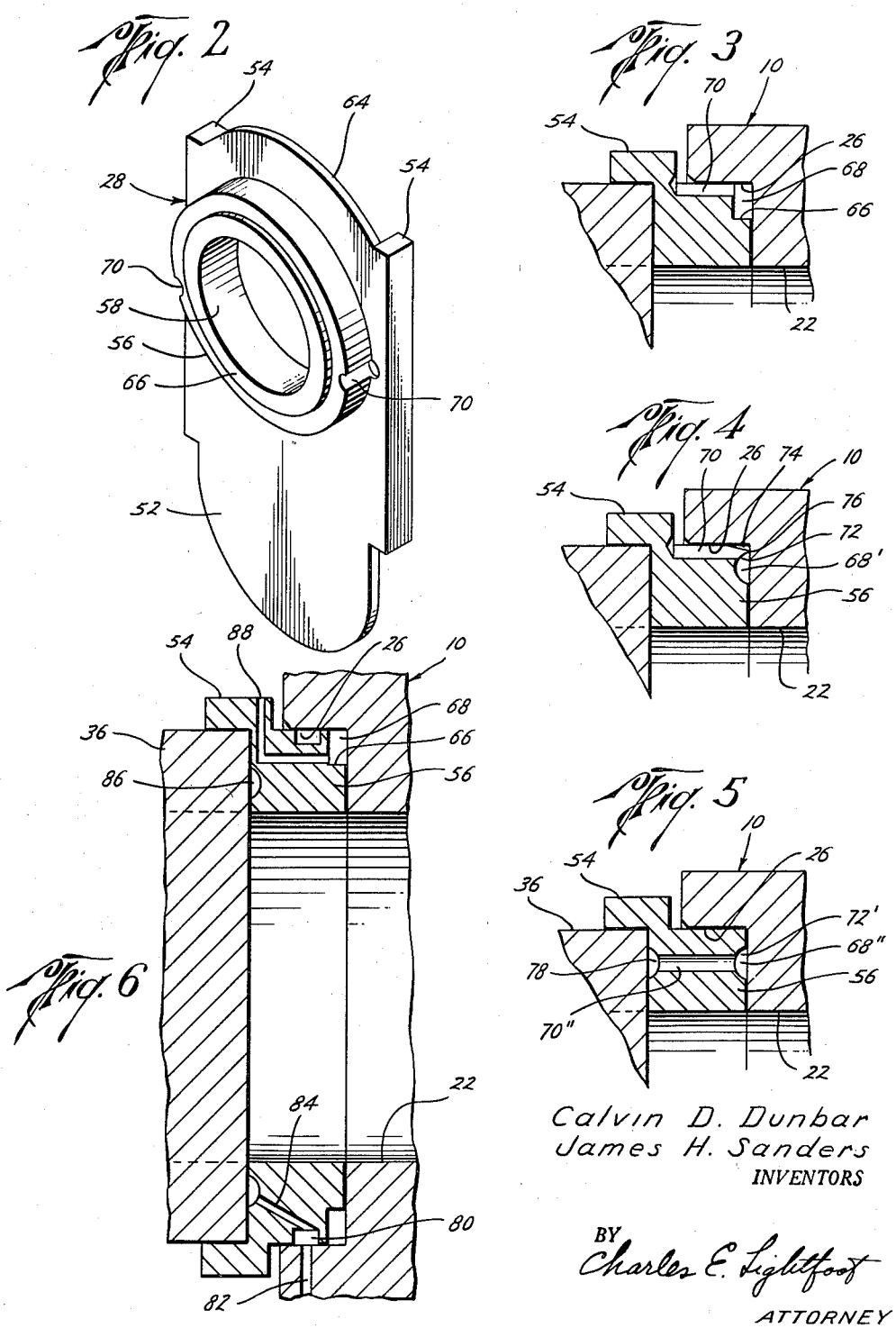

NON-FLOATING SEAT STRUCTURE FOR EXPANDING GATE VALVES

Calvin D. Dunbar and James H. Sanders, Houston, Tex., assignors, by direct and mesne assignments, to ACF Industries, Incorporated, New York, N.Y., a corporation of New Jersey Filed Dec. 24, 1956, Ser. No. 630,409

1 Claim. (Cl. 256—196)

This invention relates to a valve and seat structure therefor and more particularly to a valve of the sliding gate type and to a non-floating seat structure for the same.

The invention finds particular application in connection with gate valves of the expanding gate type wherein the gate is formed in several parts and the valve has seat forming elements on opposite sides of the gate, there being means for causing the parts of the gate to be expanded into seating engagement with the valve seats when the valve is closed and for contracting the parts to permit the gate to slide relative to the seating elements during opening and closing movements of the gate.

In the construction of gate valves of the expanding type as heretofore provided recesses are formed in the valve casing surrounding the flowway on each side of the sliding gate and seat forming elements of ring-like configuration are disposed in the recesses with their inner end faces positioned in sliding contact with the parts of the expanding gate. The seat element recess in structure of this kind are usually open to the pressure of fluid in the flowway so that upon contracting movement of the parts the gate fluid under pressure may enter the recesses beneath the seat forming elements thereby causing the elements to "float" or move inwardly toward the gate, with the result that rapid wear takes place on the parts.

A further difficulty encountered with valves of this kind is that the parts of the gate are shaped to be expanded upon relative longitudinal movement of one gate part relative to the other, so that any restraint or dragging of one part on the seat forming element with which it is engaged causes the parts to coact in a manner to expand the gate, thus causing the gate to stick. Upon such sticking of the gate further efforts to move the gate toward open position merely result in greater expansion of the gate and tighter sticking. At times it is possible to release a gate which has become so stuck by repeatedly applying a force to the gate in a direction to close the gate and then in a direction to open the same. Gate valves of this kind also sometimes become stuck in a similar way during closing movement of the gate.

The present invention has for an important object the overcoming of the above mentioned difficulties in the operation of gate valves of the expanding gate type by the provision of a novel structure whereby the dragging of the gate on the seat forming elements of the valve is prevented.

Another object of the invention is to provide means whereby the pressure of the fluid in the flowway exerted on the opposite faces of the seat forming elements of a gate valve of the expanding gate type will be equalized immediately upon contraction of the gate so that such pressure cannot cause the seat forming elements to be urged against the gate to cause the gate to drag on the elements.

A further object of the invention is the provision of a gate valve of the expanding gate type having non-floating seat forming elements embodying means for preventing the elements from being displaced by the entrance of pressure from the flowway behind the elements when the gate is in contracted condition.

The above and other important objects and advantages of the invention may best be understood from the following detailed description, constituting a specification of the same, when considered in conjunction with the annexed drawings, wherein—

Figure 1 is a central, vertical, cross-sectional view of a gate valve of the expanding gate type illustrating a preferred embodiment of the invention, the gate being shown in closed position;

Figure 2 is a perspective view of one of the seat forming elements of the valve of Figure 1, separated from the remaining parts of the structure and showing details of construction of the element;

Figure 3 is a fragmentary, cross-sectional view, on a somewhat enlarged scale, taken along the line 3—3 of Figure 1, looking in the direction indicated by the arrows;

Figure 4 is a view similar to that of Figure 3 illustrating a somewhat modified form of the invention;

Figure 5 is a view similar to that of Figure 3 illustrating a further modification of the invention;

Figure 6 is a fragmentary, horizontal, central, cross-sectional view on an enlarged scale illustrating a further modification of the invention; and Figure 7 is a view similar to that of Figure 3, illustrating a still further modification of the invention.

Referring now to the drawings in greater detail, the invention is illustrated in connection with its application to a gate valve of the expanding gate type having a valve casing 10 of usual construction provided with an opening 12 at the top closed by a bonnet 14 through which a valve stem 16 is rotatably and slidably extended. The casing is also formed with the usual side extensions 18 and 20 which are internally threaded to enable the casing to be connected into a flow line. A flowway 22 is formed in the casing between the connections 18 and 20 through which fluid in the flow line may flow when the valve is open.

Surrounding the flowway 22 the casing is provided with spaced apart internal annular recesses 24 and 26, within which seat forming elements 28 and 30, respectively are slidingly force fitted, which extend inwardly beyond the recesses and are in sliding engagement with the valve gate, generally indicated at 32, carried by the valve stem 16 for vertical movement in the casing.

The valve gate 32 is constructed in two sections or segments 34 and 36 of complementary shape, the segment 34 having a V-shaped face 38, while the segment 36 is provided with a face 40, shaped to fit the V of the segment 34, and wedgingly engageable therewith, upon longitudinal movement of the segments in either direction relative to each other, to expand the gate against the seat forming elements 28 and 30. The segments are provided with through openings 42 and 44, which are positioned to be in registration with the flowway 22 when the gate is in fully open position, and to be out of alignment with the flowway when the gate is in closed position. Suitable means, such as the lugs 46 on the segment 34 and the lug 48 on the segment 36, is provided, positioned for engagement with a spring element 50, to yieldingly urge the segments toward retracted position.

The seat forming elements 28 and 30 are of identical construction, as best seen in Figure 2, each of the elements including a skirt portion 52 having outwardly directed flanges 54 along its side edges, between which one of the gate segments is slidably positioned, when the structure is assembled. Each of the seat forming elements also includes an annular projecting portion 56, extending from the face of the skirt opposite the flanges 34 and which surrounds an opening 58 through the element, the projections 56 being adapted to extend into one of the recesses 24 or 26, when the parts are assembled.

The contacting faces 60 and 62 of the gate segments 34 and 36, which engage the inner faces 64 of the seat forming elements, may be highly finished, to enable the gate to slide easily between the faces of the elements with which the segments are in contact.

The gate segment 36 is of a length to extend upwardly and downwardly beyond the segment 34, so that when the valve reaches closed position, as illustrated in Figure 1, the lower end of the segment 36 may engage the bottom of the casing, to hold the segment 36 against further downward movement in the casing, whereupon further downward movement of the segment 34 by operation of the valve stem 16 will cause the segment 34 to move downwardly longitudinally relative to the segment 36, which results in a wedging action between the faces 38 and 40 and expansion of the gate against the seat forming elements. Upon upward movement of the segment 34 with the valve stem 16 the segment 34 moves out of wedging engagement with the segment 36, and under the influence of the spring 50 the segments are retracted to permit the gate to slide upwardly between the seat forming elements to move the gate to open position.

Gate valves of this type, as heretofore commonly constructed, are subject to the disadvantage that fluid under pressure in the flowway 22 may enter the recesses 24 and 26 between the valve casing and the seat forming elements, as soon as the segments move to retracted position, whereupon the pressure of the fluid beneath the seat forming elements tends to urge the elements toward the gate segments, thus causing the segments to drag on the elements. Under these conditions the frictional resistance due to the dragging of the segment 36 on the seat forming element 30 tends to arrest longitudinal movement of the segment 36, whereupon the segment 34 may move into wedging engagement with the segment 36, to expand the gate, causing the gate to stick between its open and closed positions. Upon such sticking of the valve gate the application of additional force on the stem 16 in an endeavor to move the gate merely results in further expansion of the segments, thus more tightly sticking the gate. When such sticking occurs attempts are often made to release the gate by repeated downward and upward movements of the valve stem, whereby the segments are repeatedly retracted and expanded, until the gate is moved to the desired position. Such attempts to release the gate are frequently unsuccessful, however, due to the continued dragging of the gate segments on the seat forming elements, and it may then be necessary to disassemble the valve in order to restore its operation.

The present invention has for its chief object the provision of means whereby the above disadvantage of expanding gate valves of the type referred to may be avoided, by the provision of means for preventing the pressure in the flowway from acting upon the seat forming elements to urge the seat forming elements against the gate.

To the attainment of the purposes of the invention the edge of the seat forming elements, as illustrated in Figures 1, 2 and 3, may be provided with an annular outer end portion 66, of reduced external diameter, which forms with the casing a chamber 68 located at the bottom of the recess 24, or 26, and into which fluid in the flowway may flow and have a tendency to cause movement of the seat forming element outwardly of the recess when the gate segments are retracted. Each of the elements is also provided with one or more passageways 70, located to provide fluid flow communication between the chamber 68 and the interior of the valve casing radially outwardly of the flowway, whereby the pressure in the chamber 68 may be relieved, and the pressure between the inner and outer end faces of the seat forming elements will be equalized.

In the operation of the invention, constructed and arranged as described above, the seat forming elements 28 and 30 will be held in substantially fluid tight sealing engagement with the bottoms of the recesses 24 and 26 and their inner faces will be in substantially fluid tight contact with the faces of the segments 34 and 36 in engagement therewith when the valve is in closed condition, as illustrated in Figure 1, the gate segments then being in expanded condition. Upon upward movement of the valve stem 16 from the position illustrated in Figure 1, the segment 34 will be moved upwardly, which results in contracting movement of the segments, the gate then being movable upwardly in sliding contact with the seat forming elements. Immediately upon contraction of the segments, however, fluid under pressure in the flowway 22 may enter the recesses 24 and 26 behind the seat forming elements, which fluid then flows into the chamber 68, and outwardly therefrom through the passageways 70 and into the interior of the casing outwardly of the flowway, so that the pressure of the fluid will then be equalized on the seat forming elements, thus preventing the seat forming elements from being urged into tight contact with the segments. In this manner the seat forming elements are prevented from exerting a restraining force on longitudinal movement of the segments, so that the segments remain in contracted condition until the gate has moved to open position. During closing movement of the valve the pressure of fluid in the flowway will be equalized on the end faces of the seat forming elements, so that the gate may likewise be moved to closing position without dragging on the seat forming elements.

A somewhat modified form of the invention is illustrated in Figure 4, wherein the seat forming elements are each formed with an annular groove 72 in the end face of the element which engages the bottom of the recess 24 or 26, spaced radially inwardly from the outer periphery of the portion 56. The groove 72 forms a chamber 68', similar to the chamber 68, previously described, and for the same purpose, the seat forming element also having the same passageways 70 in communication with the chamber 68' and with the interior of the casing outwardly of the flowway 22. In this form of the invention, the seat forming element is provided with a bevelled end face 74, within the recess, and has an annular end face 76 between the bevelled face 74 and the groove 72, to provide a bearing against the bottom of the groove radially outwardly beyond the chamber 68'.

This form of the invention functions in the same manner as previously described in connection with the form of the invention illustrated in Figures 1, 2 and 3.

In Figure 5, there is illustrated a further modification of the invention, wherein the seat forming element is provided with an annular groove 72', similar to the groove 72 illustrated in Figure 4, and which forms a chamber 68'' similar to the chamber 68' and for a like purpose. In this form of the invention the seat forming element is also provided with an annular groove 78 in the face thereof, which engages the gate segment, and with a passageway 70'' which communicates with the groove 78 and the chamber 68'', and through which fluid under pressure may flow from the chamber 68'' to equalize the fluid pressure on the opposite end faces of the element. This form of the invention functions in substantially the same manner as previously described.

A further modification of the invention is illustrated in Figure 6, wherein seat forming element has an annular external lubricant groove 80 in its outer periphery, which is in communication with a source of lubricant through a passageway 82 in the casing, and which is also in communication through a passageway 84 in the element with an annular lubricant groove 86, in the face of the element which engages the gate segment, whereby lubricant may be introduced to lubricate the contacting faces of the element and the gate segment. In this form of the invention the seat forming element has a portion of reduced external diameter 66, which is the same as that previously described in the form of the invention illustrated in Figures 1, 2 and 3, forming the chamber 68, and the element is provided with a passageway 88, in communication with the chamber 68 and with the interior of the casing outwardly of the flowway 22, which passageway is provided at a location so that it does not interfere with the lubricant grooves and passageways described above. The function of this form of the invention is the same as that of the previously described forms.

A still further modification of the invention is illustrated in Figure 7, wherein the seat forming element has the same externally reduced portion 66 providing the chamber 68, the valve casing being provided with one or more passageways such as that shown at 90, in communication with the chamber 68 and leading into the interior of the casing at a location outwardly of the flowway 22. In other respects this form of the invention is similar to those previously described and functions in a like manner.

It will thus be seen that the invention, constructed and arranged as described above, provides a gate valve of the expanding type, having wedgingly engageable gate segments, which are expansible into sealing engagement with seat forming elements surrounding the flowway, and in which means is provided for equalizing the pressure of the fluid in the flowway on opposite faces of the seat forming elements, to prevent the elements from dragging on the gate during opening and closing movements of the gate.

While the invention has been disclosed herein in connection with certain specific embodiments of the same, it will be understood that these are intended by way of illustration only, and that various changes can be made in the construction and arrangement of the parts without departing from the spirit of the invention or the scope of the appended claim.

Having thus clearly shown and described the invention, what is claimed as new and desired to secure by Letters Patent is:

In a parallel expanding reciprocating gate valve, a valve casing having a flowway therethrough and a chamber for a valve gate intersecting said flowway, a parallel expanding valve gate in said chamber, oppositely inwardly opening, annular recesses in the wall of the casing concentric with the flowway, each recess comprising an axial wall removed from the flowway and a radial wall outward of the chamber intersecting the flowway, and two seat forming elements, each seat forming element having a cylindrical portion, the cylindrical portion of each seat forming element pressed into one of said recesses, said cylindrical portion being of greater length than the axial length of the recess, the cylindrical portion being slightly diametrically larger than the recess whereby there is an interference fit between the cylindrical portion and recess, each of said seat forming elements having a portion extending out of said recesses into the valve chamber to form a sealing face, means for expanding said valve gate in the fully closed and fully open position to apply a force to said seat forming elements forcing them against the radial walls of the recesses thereby effecting a seal between the seat forming elements and the recesses and contracting said valve gate to permit sliding movement of the valve gate along the sealing face of the seat forming elements to the other position, a wall of the upstream seat forming element positioned against the radial wall of the recess, said wall of said seat forming element provided with an annular groove spaced from the flowway forming with the radial wall a fluid chamber and a passage in the circumferential wall of said cylindrical portion connecting said annular groove with the interior of the valve chamber to permit fluid from the upstream flowway which may flow into the upstream fluid chamber on moving the valve gate from one position to another to flow from said fluid chamber into the valve chamber exteriorly of the flowway whereby movement of the upstream seat forming element toward the valve gate resulting from pressure exerted by the fluid from the flowway is arrested and the upstream seat forming element is not forced into contact with the valve gate.

References Cited in the file of this patent

UNITED STATES PATENTS

| | | |
|---|---|---|
| Re. 20,101 | Laurent | Sept. 8, 1936 |
| 1,803,889 | Bohnhardt | May 5, 1931 |
| 2,317,657 | Volpin | Apr. 27, 1943 |
| 2,747,600 | Laurent | May 29, 1956 |
| 2,776,813 | Blackman | Jan. 8, 1957 |
| 2,810,542 | Bryant | Oct. 22, 1957 |
| 2,810,543 | Bryant | Oct. 22, 1957 |